US005377769A

United States Patent [19]

Hasuo et al.

[11] Patent Number: 5,377,769

[45] Date of Patent: Jan. 3, 1995

[54] IMPACT WRENCH HAVING AN IMPROVED AIR REGULATOR

[75] Inventors: Hiromi Hasuo, Osaka; Kunio Suzuki; Sakichi Minoura, both of Nagoya, all of Japan

[73] Assignee: Aichi Toyota Jidosha Kabushikikaisha, Nagoya, Japan

[21] Appl. No.: 160,210

[22] Filed: Dec. 2, 1993

[30] Foreign Application Priority Data

Dec. 10, 1992 [JP] Japan .................................... 4-090916

[51] Int. Cl.$^6$ .............................................. B23B 45/04

[52] U.S. Cl. .................................................... 173/169

[58] Field of Search ............... 173/104, 109, 176, 177, 173/168, 170, 169, 218, 221

[56] References Cited

U.S. PATENT DOCUMENTS

| | | | |
|---|---|---|---|
| 3,195,702 | 7/1965 | Alexander | 173/169 |
| 3,298,284 | 1/1967 | Alexander | 173/169 |
| 3,326,240 | 6/1967 | McConnaughay | 173/169 |
| 3,833,068 | 9/1974 | Hall | 173/169 |
| 4,024,892 | 5/1977 | Prisco et al. | 173/169 |
| 5,076,482 | 12/1991 | Kozyrski et al. | 173/169 |

*Primary Examiner*—Scott A. Smith

*Attorney, Agent, or Firm*—Burns, Doane, Swecker & Mathis

[57] ABSTRACT

An impact wrench having an improved air regulator comprises a cylindrical pipe provided on a handle, an air supply valve movably inserted in a back section of the cylindrical pipe, and a changeover valve movably inserted in a front section of the cylindrical pipe. The cylindrical pipe has a first air supply inlet and a second air supply inlet. The air supply valve has several air supply regulating slots of different diameters. The changeover valve has an an air supply reversing slot. The desired one of the air supply regulating slots is adapted to communicate with the first air supply inlet, so that the air flow to the air motor is regulated in the cylindrical pipe, thus obtaing a desired torque. The air supply reversing slot is adapted to communicate with the second air supply inlet only when the air motor is rotated counterclockwise. A compressed air is introduced into the air motor via the second air supply inlet, as well as the first air supply inlet communicating with the desired one of the air supply regulating slots. A more compressed air is supplied to the air motor when the air motor is rotated counterclockwise to produce an unfastening torque than when the air motor is rotated clockwise to produce a fasteing torgue.

2 Claims, 16 Drawing Sheets

IMPACT WRENCH HAVING AN IMPROVED AIR REGULATOR

BACKGROUND OF THE INVENTION

This invention relates to an air regulator for an impact wrench for use in fastening or unfastening bolts or nuts. More specifically, this invention relates to the impact wrench having an improved air regulator for regulating air flow to an air motor.

A known air regulator of this type included in an impact wrench is disclosed in Japanese Laid-Open specification No. 1-321174. This air regulator comprises an adapter valve secured to an air supply slot of a handle, a cylindrical regulator valve movably fitted on a periphery of the cylindrical regulator, said adaptor valve having air slots, said regulator valve having air supply slots of different diameters with a regular interval. When the regulator valve is operated, the air supply slot of a desired diameter is adapted to communicate selectively with the desired air slot, so that the air flow to an air motor can be regulated. However, according to the air regulator of this type, an air supply reversing means is needed to be provided in the air supply pass to make the air motor rotate reversely, which results in a complicated construction of the air regulator. Conventionally, there are some types of impact wrenches for fastening or unfastening bolts or nuts. One type of the impact wrenches is an all-purpose impact wrench, which is used for both fastening and unfastening bolts or nuts.

Normally, an unfastening operation requires a more increased toque than a fastening operation, for example, because there is some rust on bolts or nuts. For this reason, taking into account a torque necessary for unfastening bolts or nuts, a torque of the all-purpose impact wrench is determined. Accordingly, a fastening torque of the all-purpose impact wrench exceeds a specified fastening torgue. Therefore, an excessive torque is applied to fasten bolts or nuts. Thus, when unfastening bolts or nuts again, a more excessive torque is needed. In this way, a fastening torque to be applied to bolts or nuts becomes gradually more increased, which may cause deformation and breakdown of a structure. Also, a fastening torque exceeding a tolerance of a fastening bolt may cause failure of the fastening bolt.

To solve such problems, two kinds of an unfastening impact wrench and a fastening impact wrench can be used to unfasten and fasten bolts or nuts. However, the use of the two kinds of impact wrenches causes a higher cost and a longer fastening/unfastening operation, which leads to a troublesome operation.

Another type of the conventional impact wrench is a torque-adjusting impact wrench. In one type of the torque-adjusting impact wrench a control valve is adjusted to change a rotational speed of a pneumatic motor. In this type of the impact wrench the adjusting operation is complicated and an adjusted torque varies widely. In another type of the torque-adjusting impact wrench a twisted shaft is provided between an anvil shank and a driving shaft to adjust a torque. However, in this type of the impact wrench a structure of a hammer mechanism becomes complicated and expensive. In another type of the torque-adjusting impact wrench a pneumatic control circuit, a hydraulic control circuit, or an electric control circuit is provided to control a fastening torque automatically within a maximum torgue. However, in this type of the impact wrench the control circuit becomes complicated.

SUMMARY OF THE INVENTION

An object of the present invention is to provided an impact wrench having an improved air regulator in which an air supply regulating means and an air supply reversing means are provided on a handle with a simple construction.

Another object of the present invention is to provide an impact wrench having an improved air regulator which can supply more air to an air motor in making the air motor rotate in a reverse direction than in making the air motor rotate in a normal direction.

A further object of the present invention is to provide an impact wrench having an improved air regulator which can regulate air flow to an air motor with a simple construction.

To attain the above-mentioned objects, the impact wrench having the improved air regulator comprises a handle having an air supply pass and an air release pass, a cylindrical pipe provided on the handle, an air supply valve movably inserted in a back section of the cylindrical pipe, a changeover valve movably inserted in a front section of the cylindrical pipe, said cylindrical pipe having a first air supply inlet and a second air supply inlet on a back thereof and further having a first air slot, a second air slot, and a third air slot on a front thereof, said air supply valve having a first hollow chamber and several air supply regulating slots of different diameters with regular intervals, said changeover valve having a second hollow chamber and an air supply reversing slot on a back thereof and an air supply outlet and an air release gloove on a front thereof.

The first air supply inlet and the second air supply inlet communicate with the air supply pass. The first air slot and the second air slot communicate with two air passes leading to an air motor, while the third air slot communicates with the air release pass. The air supply regulating slots communicate selectively with the first air supply inlet. The air supply reversing slot is adapted to communicate with the second air supply inlet. The air supply outlet is adapted to communicate selectively with the first air slot and the second air slot. The air release gloove communicates with the first air slot and the third air slot or communicates with the second slot and the third air slot. The air supply reversing slot communicates with the air supply outlet. The air supply outlet communicates with the second hollow chamber via a communicating slot. The second hollow chamber communicates with the first hollow chamber.

To make the air motor rotate clockwise, the changeover valve and the air supply valve are operated by an operator. The changeover valve is operated; so that the second air supply inlet of the cylindrical pipe closes; so that the air supply outlet of the changeover valve communicates with the second air slot of the cylindrical pipe; and so that the air release groove communicates with the first air slot and the third air slot of the cylindrical pipe, while the air supply valve is operated so that the air supply regulating slot of the desired diameter communicates with the first air supply inlet of the cylindrical pipe. At this stage, when the compressed air is introduced from the air supply pass, the compressed air flows into the air motor in the following order: via the first air supply inlet, the air supply regulating slot, the first hollow chamber of the air supply valve, the second hollow chamber of the changeover valve communicating with the first hollow chamber, the communicating slot, the air supply outlet, the second air slot of the cylindrical pipe, and the one air pass. The compressed air is released from the air motor into the air release pass in the following order: via the other air pass, the first air slot, the air release pass, and the third air slot.

To make the air motor rotate counterclockwise, the changeover valve and the air supply valve are operated by an operator. The changeover valve is operated reversely; so that the air supply reversing slot communicates with the second air inlet of the cylindrical pipe; so that the air supply outlet communicates with the first air slot of the cylindrical pipe; and so that the air release groove communicates with the second air slot and the third air slot of the cylindrical pipe, while the air supply valve is operated so that the air regulating supply slot of the desired diameter communicates with the first air supply inlet of the cylindrical pipe. At this stage, when the compressed air is introduced from the air supply pass, the compressed air flows into the air motor in the following order: via the first and the second air supply inlet, the first hollow chamber of the air supply valve and the second hollow chamber of the changeover valve communicating with the first hollow chamber,the communicating slot, the air supply outlet of the changeover valve, the first air slot of the cylindrical pipe, and the one air release pass. The compressed air is released from the air motor into the air release pass in the following order: via the other air pass, the second air slot, the air release groove, and the third air slot.

Other and further objects, features and advantages of the invention will become appear more fully from the following description.

BRIEF DESCRIPTION OF THE DRAWING

FIG. 10(*b*) is an exploded perspective view of a cylindrical pipe.

FIG. 10(*c*) is an exploded perspective view of an air supply valve.

FIG. 21(*b*) is a section view taken on line II—II of FIG. 20.

FIG. 22(*b*) is a section view taken on line III—III of FIG. 20, for explaining a fastening operation of the impact clutch.

FIG. 23(*b*) is a front view of the anvil shank.

FIG. 23(*c*) is a lower face view showing the anvil shank broken away.

FIG. 23(*d*) is a left-side elevation view of the anvil shank.

FIG. 23(*e*) is a right-side elevation view of the anvil shank.

FIG. 24(*b*) is an upper face view of the cage.

FIG. 24(*c*) is a right-side elevation view of the cage.

FIG. 25(*b*) is a right-side elevation view of the dog.

FIG. 26(*b*) is a right-side elevation view of the cam

DETAILED DESCRIPTION OF THE PREFERRED EMBODIMENT

Figure 1:
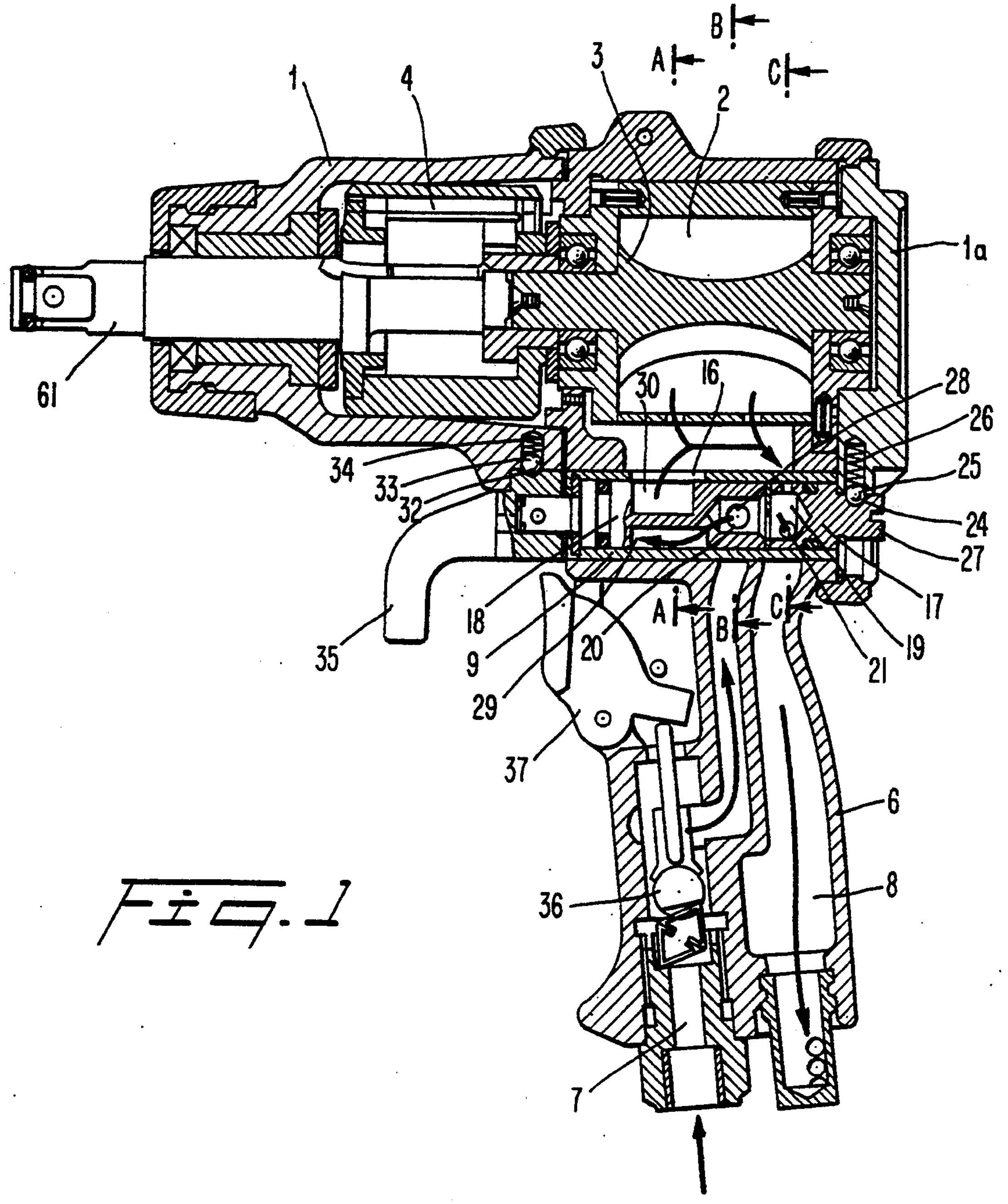
FIG. 1 is a vertical sectional side view of an entier impact wrench.

Referring now to FIG. 1, an impact wrench of the present invention comprises a hammer housing 1, a motor housing 1', and a handle 6 provided on a lower end of the motor housing 1', said handle 6 having a trigger 37.

The hammer housing 1 includes a hammer mechanism 4 and on anvil 5, said anvil 5 being rotationally provided in said hammer housing 1. The motor housing 1' includes an air motor 2 with a rotating shaft 3. The handle 6 has two air passes formed inside it: an air supply pass 7 and an air release pass 8. The air supply pass 7 is connected to an air supply source (not shown) via a hose, while the air release pass 8 leads to the air motor 2. In the known manner a compressed air is introduced into the motor housing 1' from the air supply pass 7. With the supply of a compressed air, the air motor 2 is rotated clockwise or counterclockwise by operating the trigger 37. At the same time, the rotating shaft 3 drives the hammer mechnisem 4, which rotates the anvil 5.

Referring first to FIG. 20 to FIG. 26(*b*), the preferred hammer mechanism 4 of the present embodiment is explained hereinafter.

The hammer mechanism 4 is an impact clutch which can adjust a fastening torque to a specified value and produce a tighter unfastening torque than the fastening torque According to the hammer mechanism 4, impact ends of a dog have mutually non-symmetrical shapes, while projection ends with flats also have mutually non-symmetrical shapes. That is, the impact ends and the projection ends have such shapes that a tangent line of an impact point on which the one impact end impacts against the one flat of the projection end does not pass a center point of the cam when the rotor rotates to produce a fastening torque and that a tangent line of the impact point on which the other impact end impacts against the other flat of the projection end passes the center point of the cam when the rotor rotates to produce an unfastening toque. Due to the shapes of said impact ends and said projection ends, a fastening torque becomes different from an unfastening torque.

Figure 20:
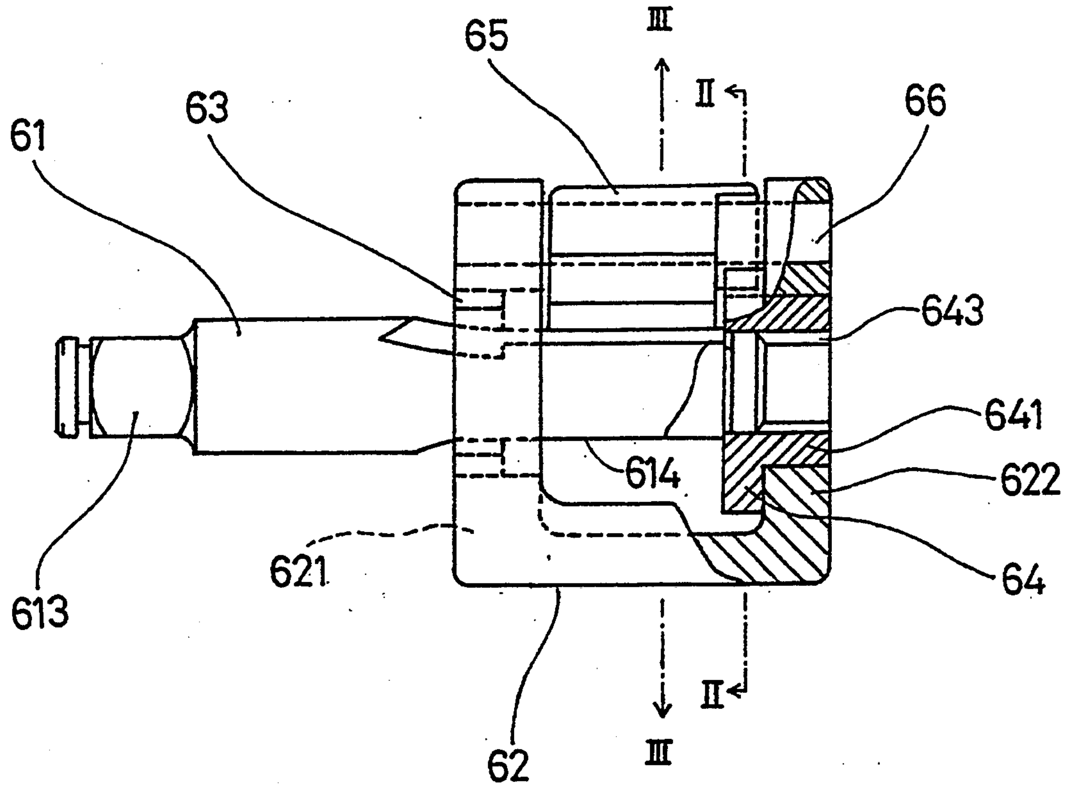
FIG. 20 is a front view showing an impact clutch broken away.
Figure 21A:
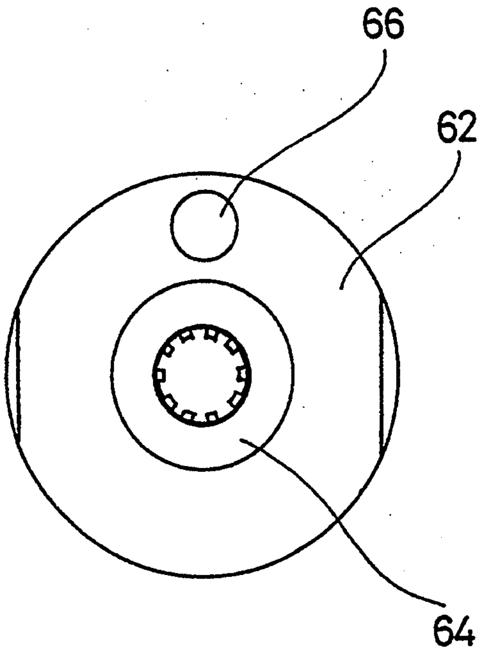
FIG. 21(*a*) is a side elevation view of the impact clutch.
Figure 21B:
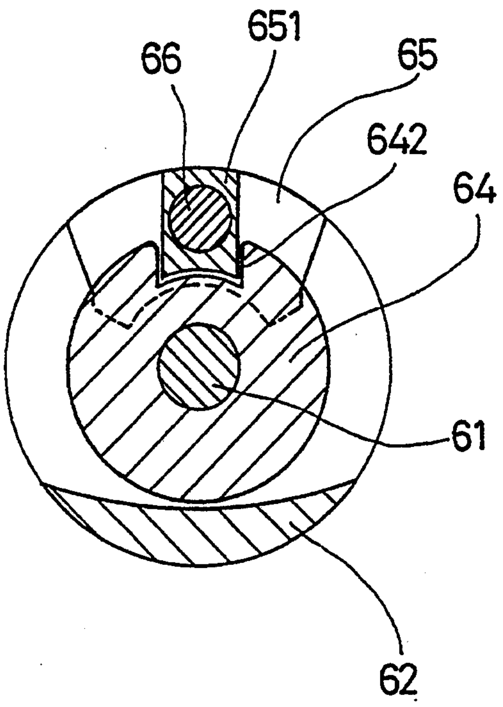
Figure 22B:
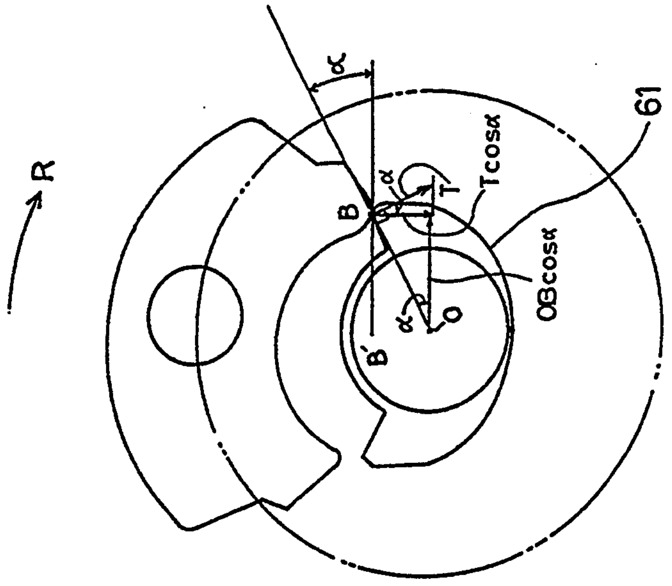
FIG. 22(*a*) is a section view taken on line III—III of FIG. 20, for explaining an unfastening operation of the impact clutch.
Figure 22A:
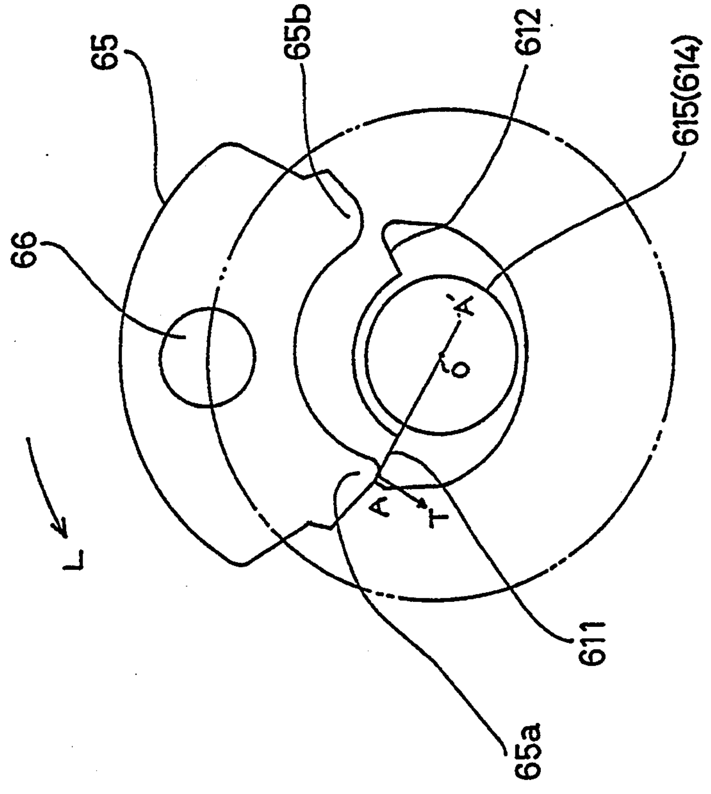
Figures 23A, 23B, 23C, 23D, 23E:
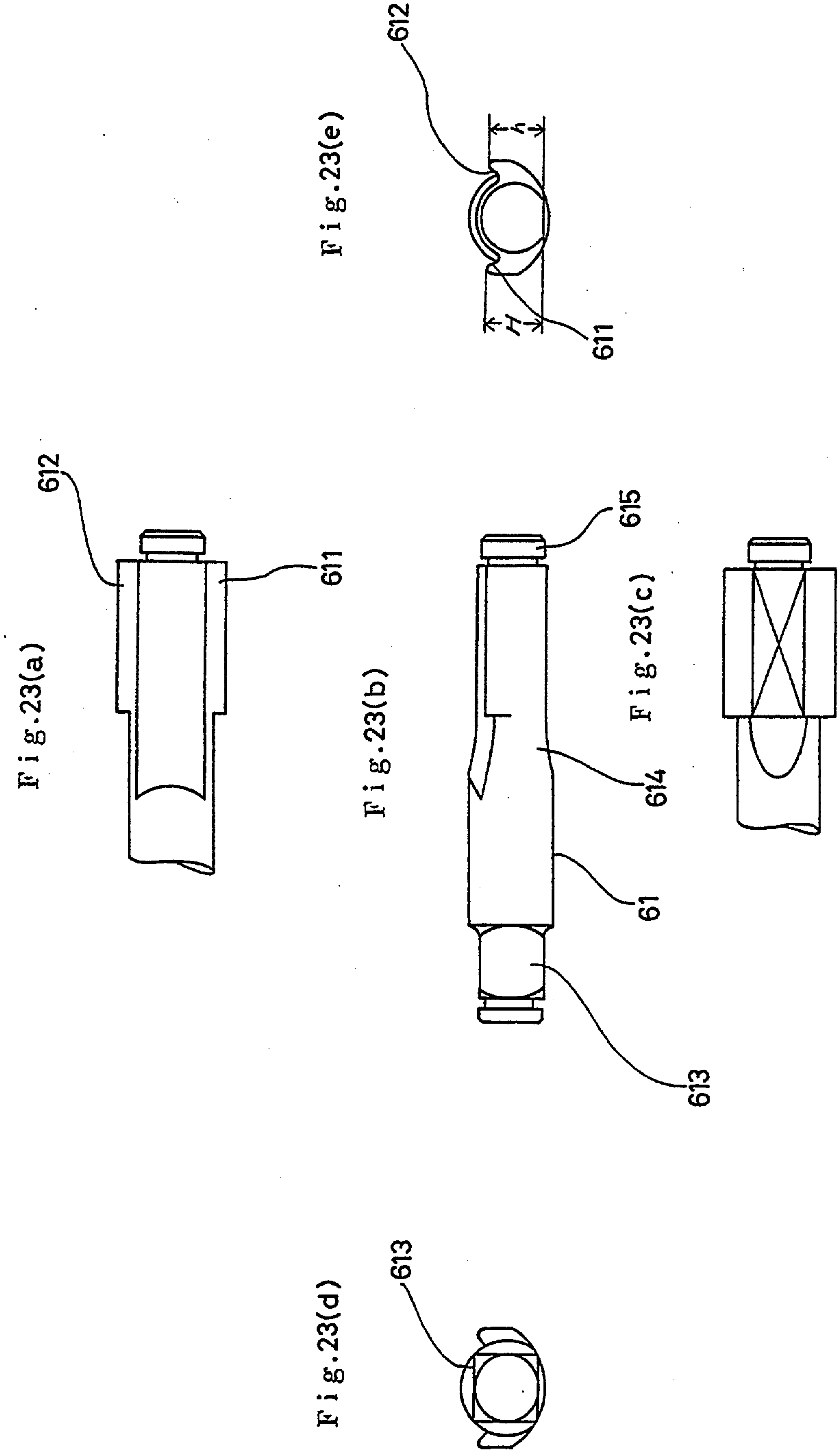
FIG. 23(*a*) is an upper face view showing an anvil shank broken away.
Figure 24A:
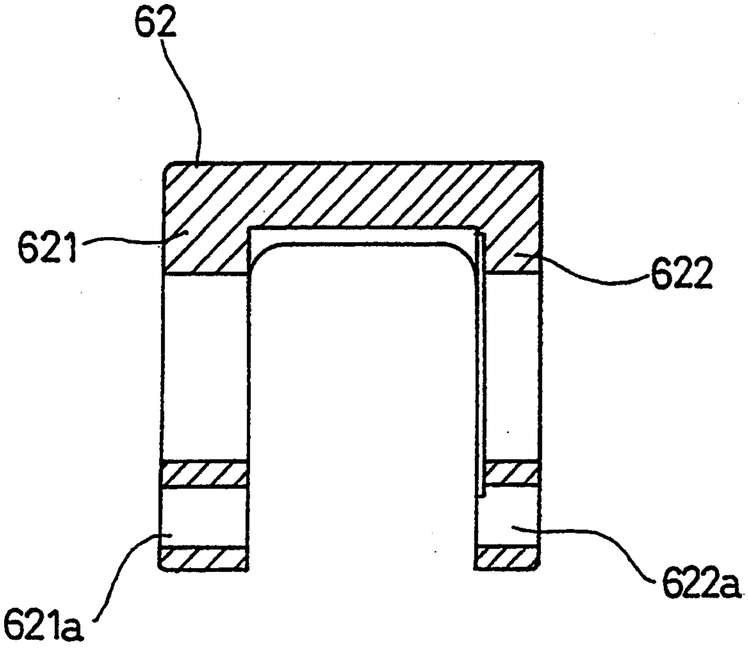
FIG. 24(*a*) is a vertical section of a cage.
Figure 24B:
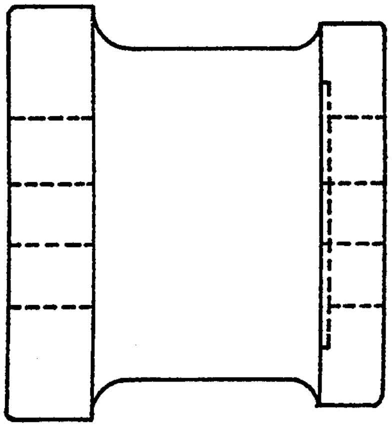
Figure 24C:
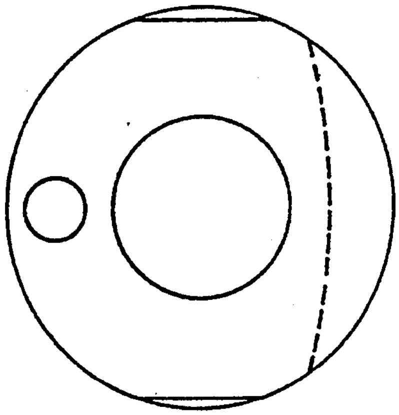
Figure 25A:
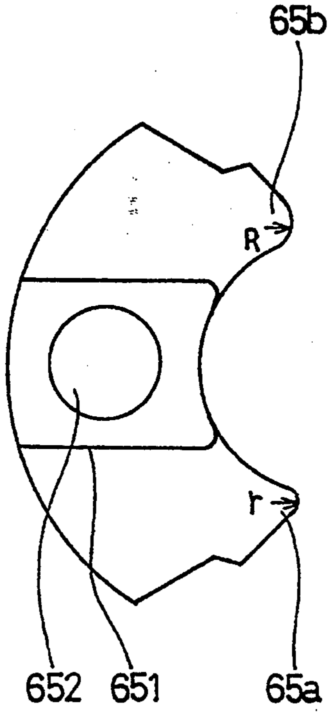
FIG. 25(*a*) Is a front view of a dog.
Figure 25B:
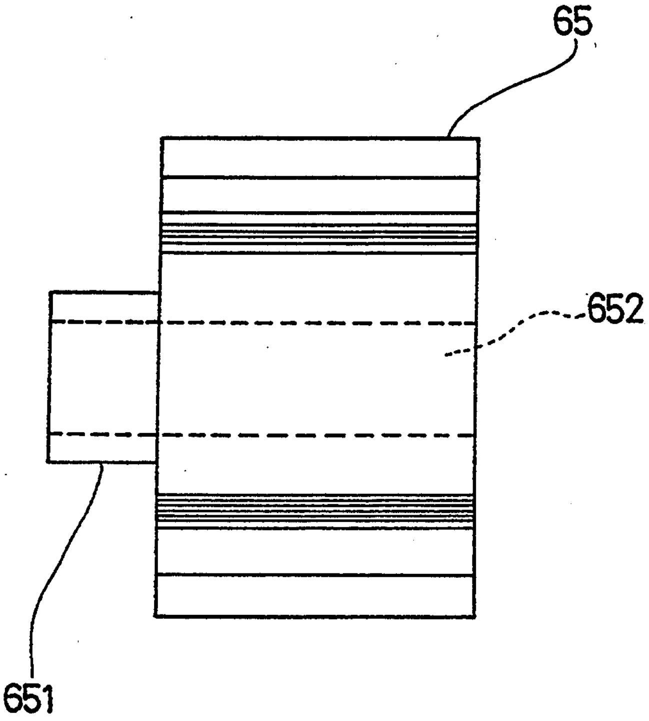
Figure 26A:
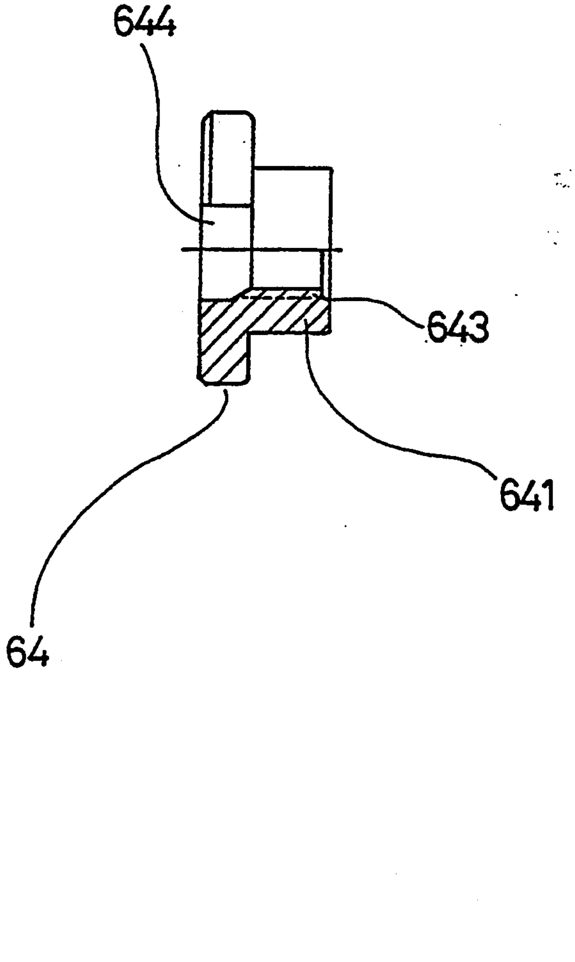
FIG. 26(*a*) is a front view showing a cam half broken away.
Figure 26B:
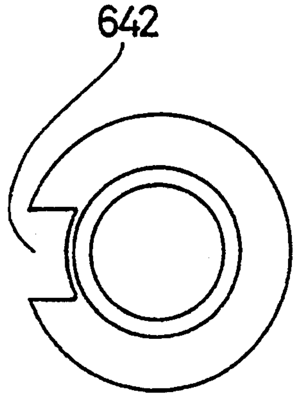

Referring to FIG. 20 FIG. 22(*a*) to FIG. 22(*b*) and FIG. 23(*a*) to FIG. 23(*e*), there is shown therein a hammer mechanism 4 of the present invention. As illustrated in FIG. 20, the hammer mechanism 4 includes an anvil shank 61, a cage 62, a bush 63, a cam 64, a dog 65, a pin 66. As illustrated in FIG. 23(*a*) to FIG. 23(*e*), the anvil shank 61 consists of a head 613, a body 614, and a tail 615, said head 613 having four square surfaces, said body 614 having projection ends with flats 611 and 612 on both sides thereof. As illustrated in FIG. 24(*a*), the cage 62 has disc-like end walls 621 and 622, said disc-like end walls 621 and 622 with holes 621*a* and 622*a*. As illustrated in FIG. 26(*a*) and FIG. 26(*b*), the cam 64 has a shaft 641 formed therewith and has a hole 644 in its center and a groove 642 at its end, said shaft 641 with a serration 643 in its center. As illustrated FIG. 25(*a*) and FIG. 25(*b*), the dog 65 has impact ends 65*a* and 65*b* at its opposite sides and a projection 651 in its center. The dog 65 also has a through hole in its center.

The structure of the hammer mechanism 4 will be explained hereinafter. The head 613 is adapted to hold a socket (not shown) for supporting a bolt or a nut. The body 614 of the anvil shank 1 is rotatably supported centrally in the end wall 621 of the cage 62 by the bush 63. The cam 64 is rotatably supported in the end wall 622 of the cage 62 by the shaft 641 formed with the cam 64. The projection 651 of the dog 65 is inserted in the groove 642 of the cam 64 in such a way that the projection 651 is out of contact with the groove 642. The tail 615 of the anvil shank 61 is supported in the hole 644 of the cam. The pin 66 is inserted in the through hole 652 of the dog 65 and both ends of the pin 66 is supported in the holes 621*a* and 622*a* of the cage 62 so that the dog 65 is swingably supported on the pin 66.

As illustrated in FIG. 22(*a*) FIG. 22(*b*), the flats 611 and 612 are not symmetrical about a vertical line (not shown). The impact end 65*a* impacts against the flat 611 on an impact point (line) A when a bolt or a nut is fastened. The impact end 65*b* impacts against the flat 612 on an impact point (line) B when a bolt or a nut is unfastened. A tangent line AA' of the impact point A passes a center point 0 of the tail 615 of the anvil shank 61. In contrast thereto, a tangent line BB' does not pass the center point 0 of the tail 615 of the anvil shank 61, but tilts through an angle $\alpha$ relative to a line extending from 0B line connecting the impact point B and the center point 0.

That is, the projection having the flat 612 is polished or cut to have a large curved radius, so that a height h of the projection having the flat 612 is lower than a height H of the projection having the flat 611, as illustrated in FIG. 23(*e*). The impact end 65*b* is polished or cut to have a larger curved radius R than a curved radius r of the impact end 65*a*, so that the impact end 65*b* differs from the impact end 65*a* in a whole shape, as illustrated in FIG. 25(*a*).

The operation of the impact mechanism 4 is as follows: When the cam 64 is rotated via the serration 643 by a rotor of a pneumatic motor(not illustrated), the dog 65, the pin 66 and the cage 62 rotates in one body to rotate the anvil shank 61.

If a bolt or a nut is to be unfastened, as illustrated with an arrow L of FIG. 22(*a*), the dog 65 is caused to swing by the cam 64 so that the impact end 65*b* of the dog 65 disengages from the flat 612. As soon as the the impact end 65*b* disengages from the flat 612, the impacts end 65*a* impacts against the flat 611 to move the anvil shank 61. Subsequently, the dog 65 is caused to swing by the cam 4, so that the impact end 65*a* disengages from the flat 611. After the impact end 65*a* disengages from the flat 611, the dog 65 rotates about the anvil shank 61, till the impact end 65*a* proceed to another impact against the flat 611. If a bolt or a nut is to be fastened, the dog 65 rotates clockwise in the direction illustrated with an arrow R to rotate the anvil shank 61 clockwise in the same mechanism as a bolt or a nut is to be unfastened. With such a mechanism, a bolt or a nut in the socket (not shown) attached to the head 613 of the anvil shank 61 is rotated for fastening or unfastening.

If the dog 65 rotates in the anti-clockwise direction to unfasten a bolt or a nut as illustrated in FIG. 22(*a*), the tangent line AA' passes the center 0 of the anvil shank 61. Therefore, a torque T is applied to the impact end 611 through a right angle, so that an increasing torque can be obtained to unfasten a bolt or a nut.

If the dog 65 rotate in the clockwise direction to fasten a bolt or a nut as illustrated in FIG. 22(*b*), the tangent line BB' does not pass the center 615 of the anvil shank 61, tilts by the angle a relative to the line extending from the 0B line connecting the impact point B and the center point 0. Namely, the line 0B and a direction in which an impact torque T is produced make a angle of $90°-\alpha°$. In this case the fastening torque is expressed as: the fastening torque$=T\cdot f\ [\cos(90-\alpha°)]$ The inventor made an experiment with the flat 611 having a 0.7 mm radius, the flat 612 having a 3 mm radius, the impact end 65*a* having a 1 mm radius, and the impact end 65*b* having a 3 mm radius. The result is that a fastening torque was dropped to 11 to 13 m-Kg, while a unfastening torque was maintained at about 35 m-Kg.

In the above-mentioned embodiment a pneumatic motor serves as a driving source to rotate the cam 64, the dog 65, the pin 66 and the cage 62. However, an electrically-driven motor and a hydraulic motor may be employed as a driving source. Also, in the above-mentioned embodiment, only one dog is used. However, two dogs and four flats of the anvil shank may be used.

The impact wrench of the present invention has the above-identified structure. Therefore, the fastening torque can be dropped to a specified value while adjusting the unfastening torque to a high value. Accordingly, when using the impact wrench of the present invention, a specified torque can be applied to fasten a bolt or a nut, thus eliminating an excessive fastening operation which causes a construction deformation and a breakdown of the bolt. Further, the effects offered by the impact wrench of the present invention is that fastening or unfastening a bolt or a nut is easy, efficient and reliable, and a structure is easy and low-cost.

Figure 2:
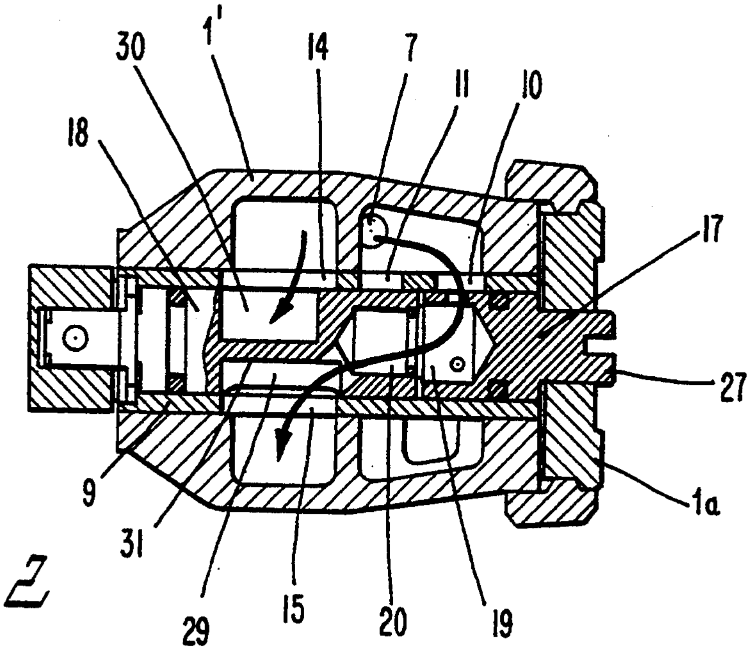
FIG. 2 is a transverse sectional view of an air regulator a clockwise rotation of an air motor.

Next an embodiment of the air motor 2 is explained. As illustrated in FIG. 1, a cylindrical pipe 9 is rotatably supported on the handle 6. As illustrated in FIG. 2, the cylindrical pipe 9 has a first air supply inlet 10 and a second air supply inlet 11 with a short interval on a back thereof, said first air supply inlet 10 and said second air supply inlet 11 both communicating with the air supply pass 7.

Figure 3:
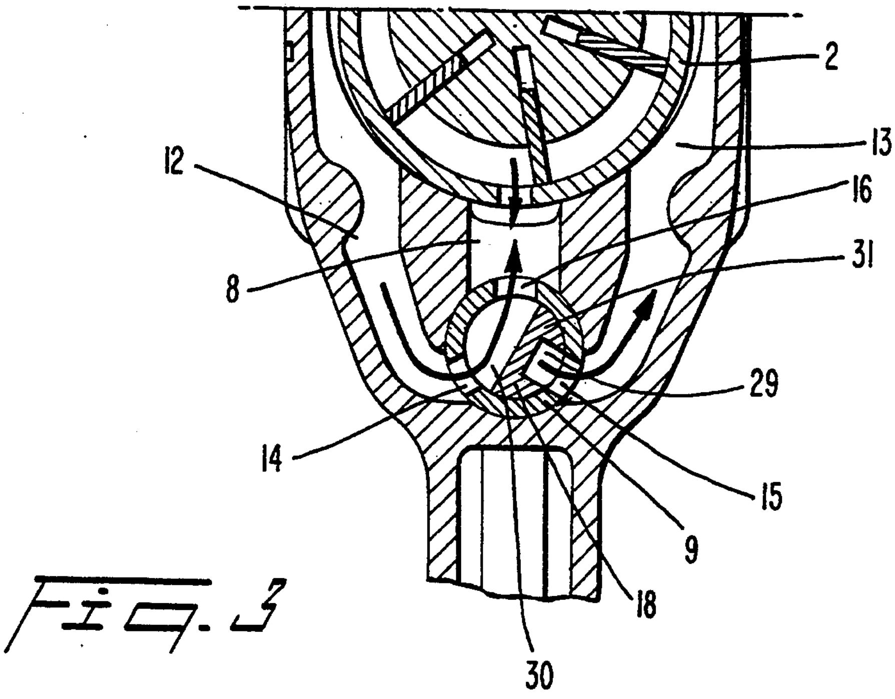
FIG. 3 is a cross-sectional view taken on line A—A of FIG. 1, of the air regulator on the clockwise rotation of the motor.
Figure 10C:
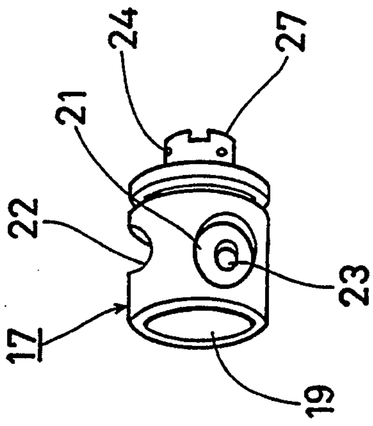
FIG. 10(*a*) is an exploded perspective view of a changeover valve.
Figure 10B:
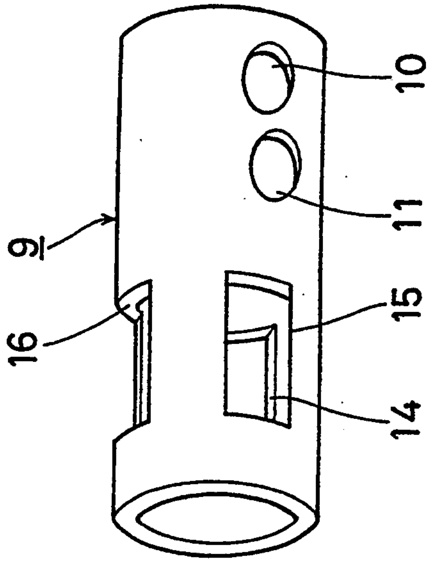
Figure 10A:
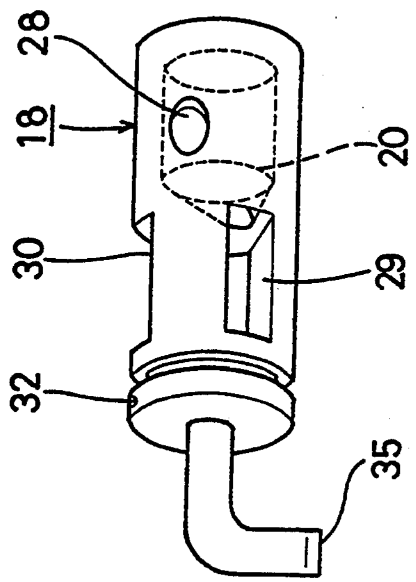
Figure 11:
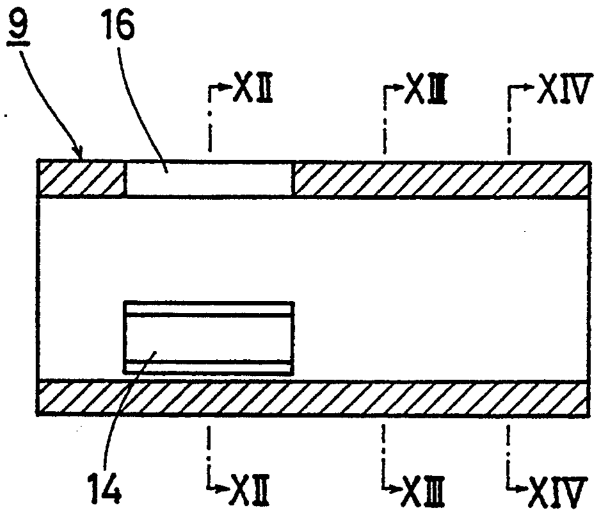
FIG. 11 is a section view of the cylindrical pipe.
Figure 12:
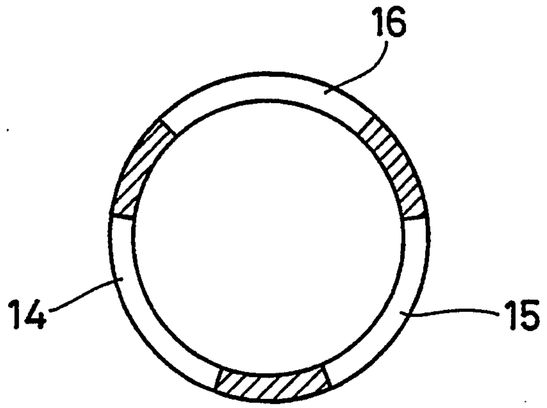
FIG. 12 is a section view taken on line XII—XII of FIG. 11.
Figure 13:
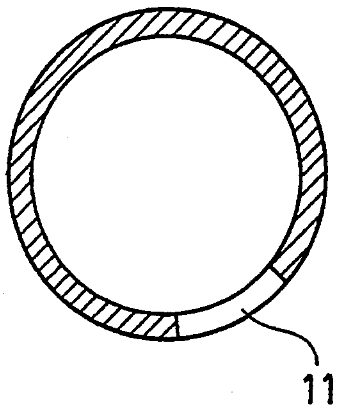
FIG. 13 is a section view taken on line XIII—XIII of FIG. 11.
Figure 14:
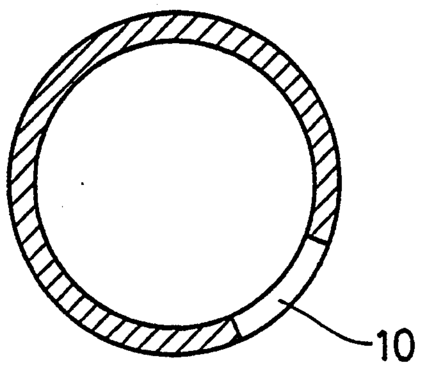
FIG. 14 is a section view taken on line XIV—XIV of FIG. 11.
Figure 15:
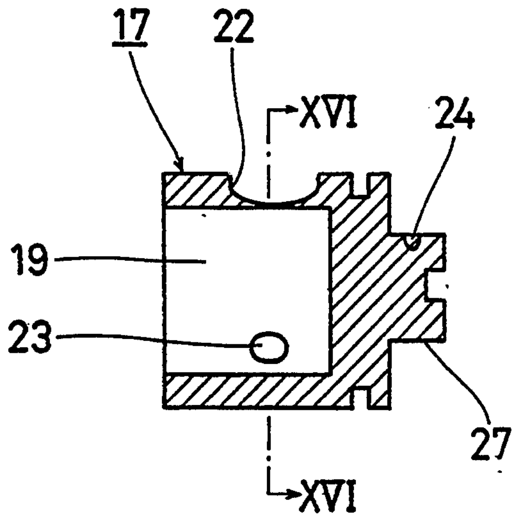
FIG. 15 is a section view of the air supply valve.
Figure 16:
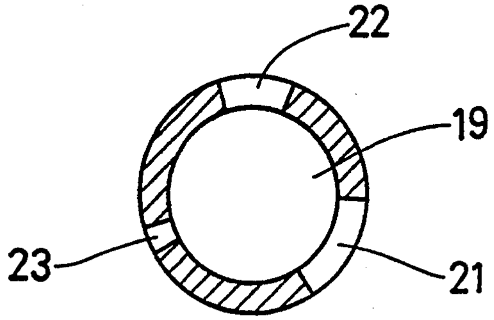
FIG. 16 is a section view taken on line XVI—XVI of FIG. 15.
Figure 17:
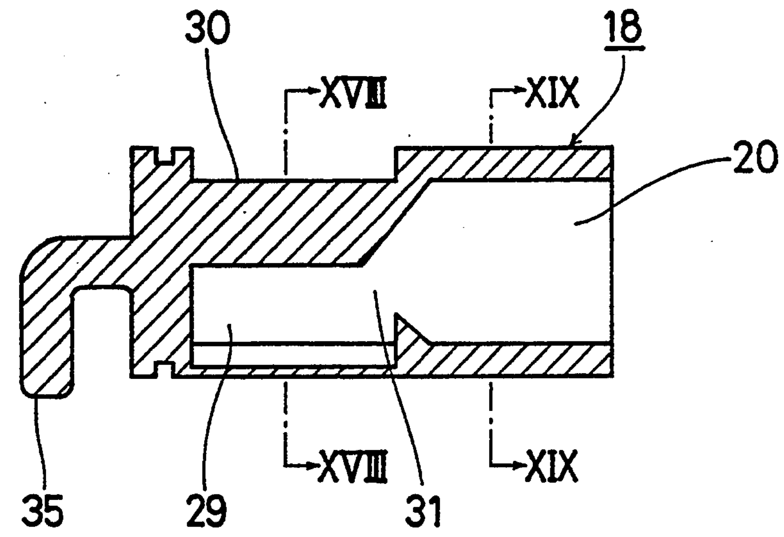
FIG. 17 is a section view of the changeover valve.
Figure 18:
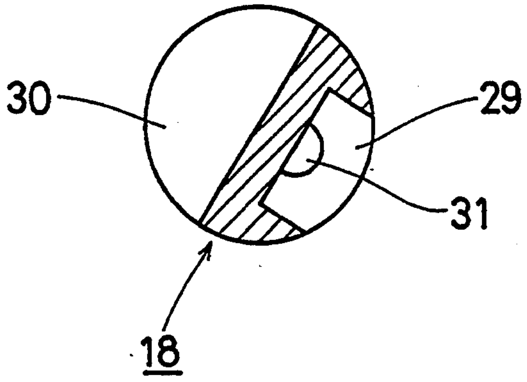
FIG. 18 is a section view taken on line XVIII—XVIII of FIG. 17.
Figure 19:
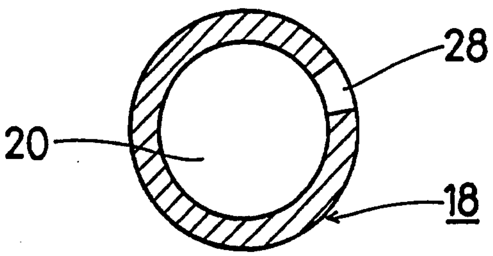
FIG. 19 is a section view taken on line XIX—XIX of FIG. 17.

Further, as illustrated in FIG. 3, the cylindrical pipe 9 has a first air slot 14, a second air slot 15, and a third air slot 16 in three orientations on a front thereof. The first air slot 14 communicates with an air pass 12, while the second air slot 15 communicates with an air pass 13, said air passes 12 and 13 leading to the air motor 2. The third air slot 16 communicates with the air release pass 8. FIG. 10(*b*) is an exploded perspective view of the cylindrical pipe 9.

Figure 5:
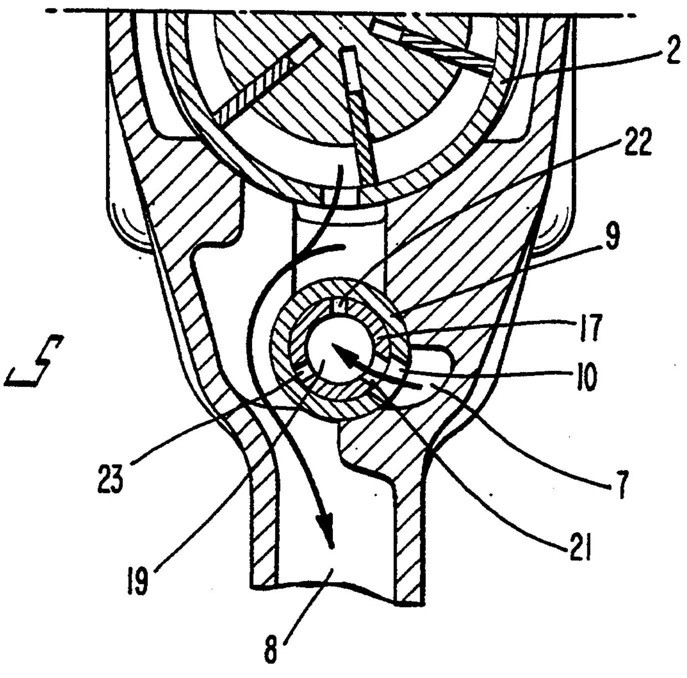
FIG. 5 is a cross-sectional view taken on line C—C of FIG. 1, of the air regulator on the clockwise rotation of the air motor.

As illustrated in FIG. 1, air supply valve 17, which is of a cylindrical shape, is rotationally inserted in a back section of the cylindrical pipe 9, while a changeouer valve 18, which is of a cylindrical shape, is rotationally inserted in a front section of the cylindrical pipe 9. FIG. 10(*a*) is an exploded perspective view of the changeover valve 18. FIG. 10(*c*) is an exploded perspective view of the air supply valve 17. The air supply valve 17 is shorter than the changeover valve 18. The air supply valve 17 has a hollow chamber 19 formed therein, while the changeover valve 18 has a hollow chamber 20 formed therein. The hollow chamber 19 and the hollow chamber 20 face and communicate with each other. The air supply valve 17 has air supply regulating slots 21, 22 and 23 provided on a peripherall wall thereof with regular intervals, as illustrated in FIG. 5. The air supply slots 21, 22, and 23 are adapted to communicate selectively with the finest air supply inlet 10. The air supply slots 21, 22 and 23 has different diameters and smaller diameters than the first air supply inlet 10. With these different diameters, the air supply slots 21, 22 and 23 regulate the air to be introduced into the air motor 2 via the first air supply inlet 10, so that a rotary torque of the air motor 2 can be changed.

Figure 4:
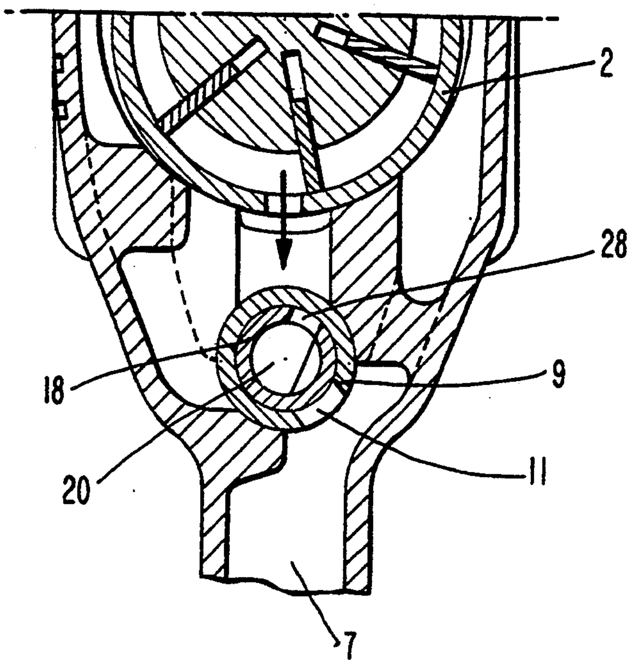
FIG. 4 is a cross-sectional view taken on line B—B of FIG. 1, of the air regulator on the clockwise rotation of the air motor.

Further, the air supply valve 17 has concavities 24 provided with regular intervals on a circumference of an end thereof, said concavities 24 which is used to select the desired one of the air supply regulating slots 21, 22, and 23. A positioning ball 25 is provided at a lower end of a rear cover 1*a* of the motor housing 1'. The positioning ball 25 is adapted to be engaged with the concavities 24 by a spring 26. Said end of the air supply valve 17, which projects from a rear cover 1*a*, serves as an operating shaft 27. The operating shaft 27 is used to communicate the desired one of the air supply regulating slots 21 to 23 with the first air supply inlet 10. The changeover valve 18 has an air supply reversing slot 28 provided on a peripheral wall of the hollow chamber 20 thereof, said air supply reversing slot 28 which is adapted to communicate with the second air supply inlet 11 of the cylindrical pipe 9, as illustrated in FIG. 4. Furthermore, the changeover valve 18 has an air supply outlet 29 and an air release gloove 30 on both sides of a front section thereof, said air supply outlet 29 to communicate selectively with the first air slot 14 and the second air slot 15, said air release gloove 30 to communicate with the first air slot 14 and the third air slot 16 or with the second air slot 15 and the third air slot 16, as illustrated in FIG. 3. The air supply outlet 29 and the air release gloove 30 are sectioned off by a shield wall 31. The air supply outlet 29 communicates with the air supply reversing slot 28.

A front end of the changeover valve 18 projects from a front section of the handle 6, said front end having two concavities 32 provided on an outer peripheral surface thereof. A positioning ball 33 is provided on a lower portion of the hammer housing 1. The positioning ball 33 engages with the concavities 32, so that the air outlet 29 and the air release gloove 30 can communicate selectively with the first to the third air slots 14 to 16. A changeover lever 35 is integrally secured to the front end of the changeover valve 18. An openable valve 36 is disposed in the air supply pass 7 of the handle 6. An operation lever 37 is movably mounted on an upper front portion of the handle 6. The operation lever 37 can be used to open or close the openable valve 36.

Next, the operation of the air regulator of the impact wrench is explained below. When a bolt or a nut is fastened, the air motor 2 is rotated clockwise by operating the changeover lever 35, the operating shaft 27, and the operation lever 37. The changeover lever 35 is used to move the changeover valve 18; so that the air supply reversing slot 28 slides on an inside surface of the cylindrical pipe 9, thereby preventing communication between the air supply reversing slot 28 and the second air supply inlet 11; so that the air outlet 29 communicates with the second air slot 15 of the cylindrical pipe 9, as illustrated in FIG. 2, and; so that the air release groove 30 communicates with the first air slot 14 and the third air slot 16 of the cylindrical pipe 9. The operating shaft 27 is used to move the air supply valve 17 so that the air supply regulating shot 21 (a desired slot) communicates with the first air supply inlet 10 of the cylindrical pipe 9, as illustrated in FIG. 5.

At this stage the operation lever 37 is used to open the openable valve 36. When the openable valve 36 opens, the compressed air is introduced into the air motor 2 from the air supply pass 7 in the following order: via the first air supply inlet 10, the air supply regulating slot 21, the hollow chamber 19 of the air supply valve 17, the hollow chamber 20 of the changeover valve 18 communicating with said hollow chamber 19, the air supply outlet 29 communicating with said hollow chamber 20, and the right air pass 13.

In this case, the he air supply regulating slots 21 to 23 can communicate selectively with the first air inlet 10, so that the air motor 2 can be supplied with the air of the amount according to diameter sizes of the air supply regulating slots 21 to 23. Thus, the air motor 2 is rotated with a torque corresponding to the air supplied according to the diameter sizes of the air supply regulating slots 21 to 23. After the compressed air is used to rotate the air motor 2, the compressed air is discharged into the air release pass 8 in the following order: via the other air pass 12, the first air slot 14, the air release glove 30, and the third air slot 16, as illustrated in FIG. 3.

Figure 6:
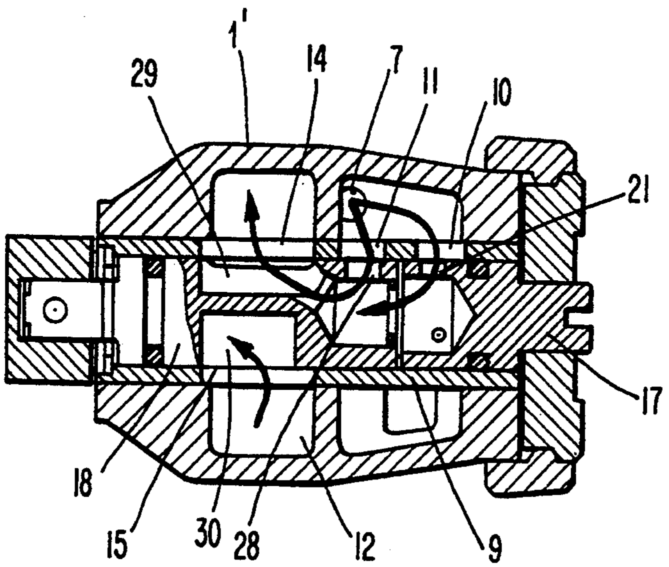
FIG. 6 is a transverse sectional view of the air regulator on a counterclockwise rotation of the air motor.
Figure 7:
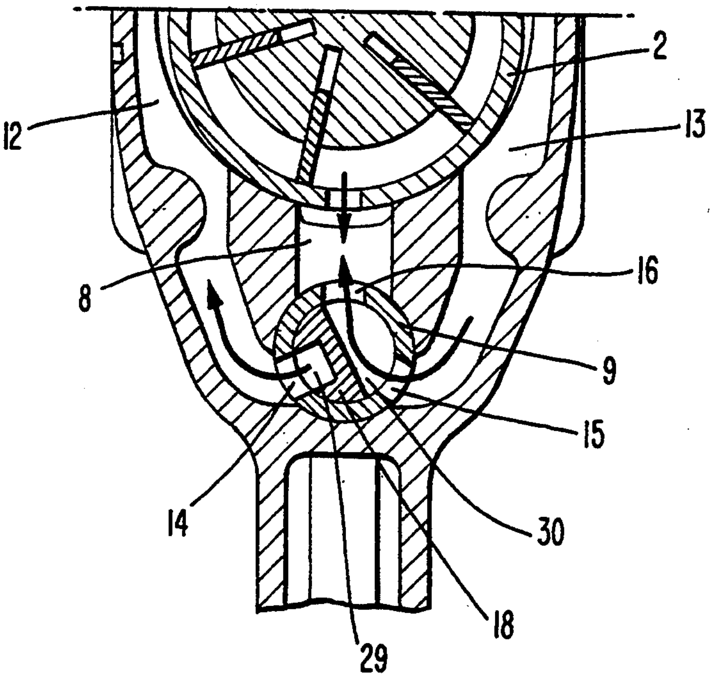
FIG. 7 is a cross-sectional view taken on line A—A of FIG. 1, of the air regulator on the counterclockwise rotation of the air motor.
Figure 8:
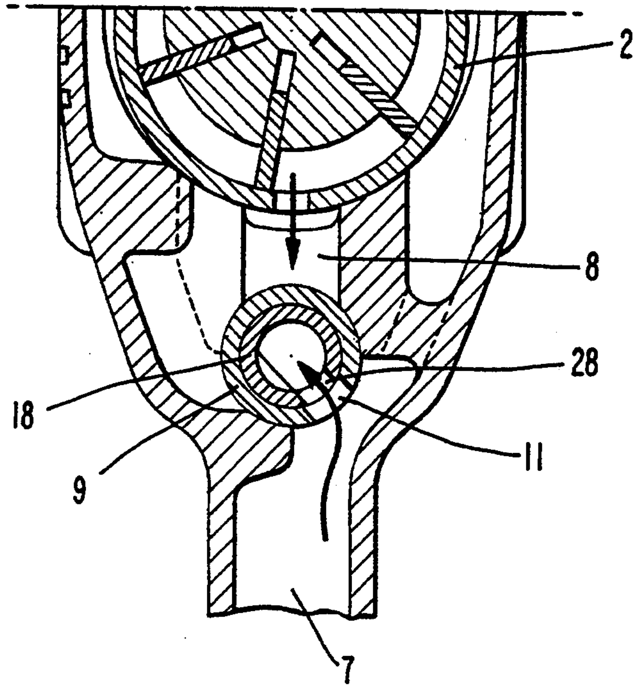
FIG. 8 is a cross-sectional view taken on line B—B ofFIG. 1, of the air regulator on the counterclockwise rotation air motor.
Figure 9:
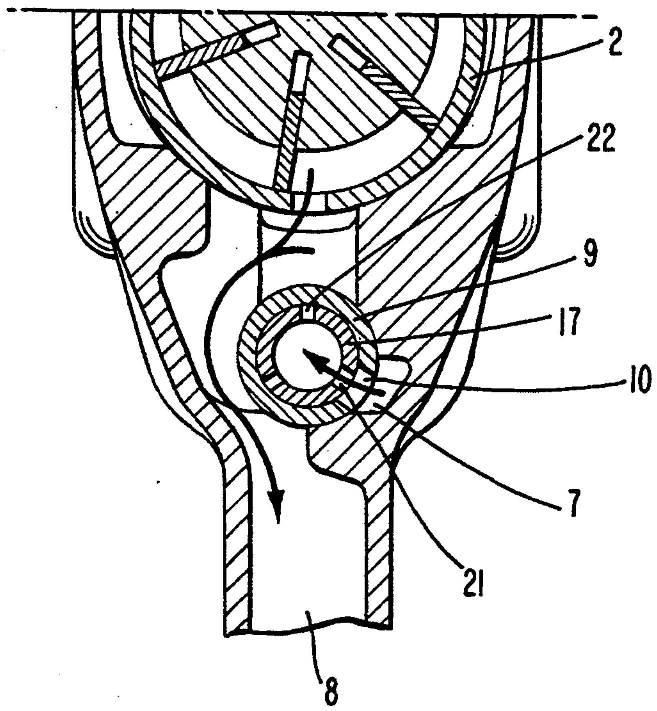
FIG. 9 is a cross-sectional view taken on line C—C of FIG. 1, of the air regulator on the counterclockwise rotation of the air motor.

When a bolt or a nut is loosen, the air motor 2 is rotated counterclockwise by operating the changeover lever 35, the operating shaft 27, and the operation lever 37. The changeover lever 35 is used to move the changeover valve 18 reversely; so that the air supply reversing slot 28 communicates with the second air supply inlet 11, as shown in FIG. 6 and FIG. 8; so that the air supply outlet 29 communicates with the first air slot 14 of the cylindrical pipe 9, as shown in FIG. 6 and FIG. 7, and; so that the air release groove 30 communicates with the second air slot 15 and the third air slot 16, as shown in FIG. 6 and FIG. 7. The operating shaft 27 is used to move the air supply valve 17 so that the air supply regulating slot 21 (a desired slot) communicates with the first air supply inlet 10 of the cylindrical pipe 9.

At this stage the operation lever 37 is used to open the openable valve 36. When the openable valve 36 opens, the compressed air is introduced into the air motor 2 from the air supply inlet 7 in the following order: via the first air supply pass 7, the first air supply inlet 10 and the second air supply inlet 11, the air supply regulating slot 21 communicating with the hollow chamber 19 and the air supply reversing slot 28, the hollow chamber 20 communicating with the hollow chamber 19, the air supply outlet 29, the air slot 14, and the left air pass 12. As a result thereof, the air motor 2 rotates counterclockwise.

When the compressed air is introduced into the air motor 2 to rotate the air motor 2 counterclockwise, the air supply reversing slot 28 communicates with the second air supply inlet 11. Thus, the compressed air is supplied to the air motor through the second air supply inlet 11, as well as the first air supply inlet 10 communicating with the desired one of the air supply regulating slots 21 to 23. The compressed air is introduced into the air motor 2 via not only the desired one of the air supply slots 21 to 23 but also the air supply reversing slot 28 to rotate the air motor 2 counterclockwise, thereby loosening tighty fastened bolts or nuts easily. The compressed air used for the motor rotation is released into the air release pass 8 in the following order: via the air pass 13, the second air slot 15, the air release groove 30, and the third air slot 16.

As described above, the air regulator of the present invention comprises: the cylindrical pipe provided on the handle, the air supply valve movably inserted in the back section of the cylindrical pipe, the changeover valve movably inserted in the front section of the cylindrical pipe, said cylindrical pipe having the first air supply inlet and the second air supply inlet communicating with the air supply pass of the handle and further having the two air slots communicating with the two air passes leading to the air motor and the other air slot pass communicating with the air release pass of the handle.

According to the above-mentioned construction, the desired one of the air supply regulating slots communicate with the first air supply inlet, so that the compressed air can be supplied to the air motor according to the diameter of the desire slot. Thus, a rotary torque of the air motor can be changed to obtain a desired torque. Further, the air flow to the air motor can be changed in the cylindrical pipe by operating the changeover valve. This leads to a simple construction and operation.

Further, the air supply reversing slot is adapted to communicate with the second air supply inlet in case the air motor is rotated counterclockwise. When the air supply reversing slot communicates with the second air supply inlet, the compressed air is supplied to the air motor through both the second air supply inlet and the first air supply inlet communicating with the desired one of the air supply regulating slots. Thus, the more compressed air is supplied to the air motor when the air motor is rotated counterclockwise than when the air motor is rotated clockwise. This results in loosening tightly fastened bolts or nuts easily.

What is claimed is:

1. An impact wrench having an improved air regulator for producing a fastening or an unfastening torque by rotating an impact clutch via an air motor,
   said air regulator comprising:
   a cylindrical pipe provided between a handle and an impact wrench body,
   an air supply valve movably inserted in a back section of the cylindrical pipe,
   a changeover valve movably inserted in a front section of the cylindrical pipe,
   said cylindrical pipe having two air supply inlets,
   said air supply valve having a plurality of air supply regulating means,
   said changeover valve having air supply reversing means,
   said one air supply inlet which is adapted to communicate with the desired one of the air supply regulating means when the air motor is rotated clockwise and counterclockwise,
   said other air supply inlet which is adapted to communicate with the air supply reversing means when the air motor is rotated counterclockwise and which is adapted not to communicate with the air supply reversing means when the air motor is rotated clockwise,
   whereby the more compressed air flows to the air motor when the air motor rotates counterclockwise to produce an unfastening torque than when the air motor rotates clockwise to produce a fastening torque.

2. An impact wrench having an improved air regulator for producing a fastening or an unfastening torque by rotating an impact clutch via an air motor,
   said impact wrench comprising:
   a handle,
   a cylindrical pipe provided on the handle,
   an air supply valve movably inserted in a back section of the cylindrical pipe,
   a changeover valve movably inserted in a front section of the cylindrical pipe,
   an impact wrench body provided on the cylindrical pipe and having the air motor and the impact clutch,
   said handle having an air supply pass, an openable valve, and an air release pass,
   said cylindrical pipe having a first air supply inlet and a second air supply inlet with a short interval on a back thereof and further having a first air slot, a second air slot, and a third air slot on a front thereof,
   said first air supply inlet and said second air supply inlet communicating the air supply pass,
   said first air slot and said second air slot each communicating with two air passes leading to the air motor,
   said third air slot communicating with the air release pass,
   said air supply valve having a first hollow chamber and several air supply regulating slots of different diameters with regular intervals,
   said first hollow chamber communicating with said air supply regulating slots,
   said air supply regulating slots which are adapted to communicate selectively with the first air supply inlet,
   said changeover valve having a second hollow chamber, an air supply reversing slot on a back thereof, and an air supply outlet and an air release gloove on a front thereof, said second hollow chamber communicating with the air supply reversing slot, said air supply reversing slot which is adapted to communicate with the second air supply inlet, said air supply outlet which is adapted to communicate selectively with the first air slot and the second air slot, said air release gloove which is adapted to communicate with the first air slot and the third air slot or communicate with the second air slot and the third air slot, said air supply reversing slot communicating with the air supply outlet, said air supply outlet communicating with the second hollow chamber via a communicating slot, said second hollow chamber communicating with the first hollow chamber, whereby the compressed air flow to the air motor is regulated by operating the air supply valve and an air flow process is changed by operating the changover valve so that the more compressed air flows to the air motor when the air motor rotates counterclockwise to produce an unfastening torque than when the air motor rotates clockwise to produce a fastening torque.

* * * * *